3,532,795
ACARICIDAL USE OF 3,5-DIHALO-ANILINES
Josef Ebersberger, Leverkusen, Karl-Friedrich Wedemeyer, Cologne-Stammheim, Ingeborg Hammann, Cologne, and Günter Unterstenhofer, Opladen, Germany, assignors to Farbenfabriken Bayer Aktiengesellschaft, Leverkusen, Germany, a corporation of Germany
No Drawing. Filed Dec. 20, 1965, Ser. No. 515,186
Claims priority, application Germany, Dec. 13, 1964,
F 44,862
Int. Cl. A01n 9/12, 9/20
U.S. Cl. 424—298                15 Claims

ABSTRACT OF THE DISCLOSURE

Methods of combating acarids by applying to such acarids and/or their habitat an effective amount of a 3,5-dihalo-4-(alkyl- or alkenyl-mercapto)-aniline.

---

The present invention relates to 3,5-dihalo-anilines, some of which are known, having acaricidal properties, to their compositions with carrier vehicles, and to new methods of use thereof.

It is already known that phosphoric acid esters, such as O,O - diethyl - O - p - nitrophenyl - thiophosphate, i.e., parathion, can be used as acaricidally active materials.

It is an object of the present invention to provide certain particular new 3,5-dihalo-anilines which possess valuable acaricidal properties, to provide active compositions in the form of mixtures of such 3,5-dihalo-anilines, some of which are known, with liquid and solid dispersible carrier vehicles, and to provide methods of using all of such compounds in a new way, including both the known and new compounds of the invention, especially for combating acarids, and the like.

Other and further objects of the present invention will become apparent from a study of the within specification and accompanying examples.

It has been found in accordance with the present invention that the particular 3,5-dihalo-anilines having the general formula

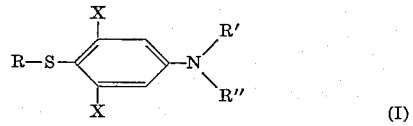

in which each X respectively is selected from the group consisting of chloro and bromo, R is selected from the group consisting of lower alkyl and lower alkenyl, R' is selected from the group consisting of hydrogen and lower alkyl, and R'' is selected from the group consisting of hydrogen, lower alkyl, lower alkanoyl, lower alkanoyloxy (i.e. alkoxy carbonyl), halo-lower alkanoyl, and halo-lower alkanoyloxy (i.e. halo-lower alkoxy carbonyl), with the proviso that R' and R'' where taken together represent the carbonyl radical, exhibit strong pesticidal, especially acaricidal, properties.

It is very surprising that the particular active substances usable according to the present invention have a stronger acaricidal action than the previously known acaricidal agent parathion. Therefore, the active compounds according to the present invention represent a valuable advance in technology.

Of the active compounds usable according to the present invention, only the following two compounds are known: 3,5 - dichloro - 4 - methylmercapto - aniline (Ia) and 3,5-dibromo - 4 - methylmercapto-aniline (XIa) [cf. J. Am. Chem. Soc. 80, 4939 and 4940], but these have not heretofore been suggested as having the specific properties discovered in accordance with the present invention.

The other instant active compounds can be prepared in known manner and in a simple way. Two such processes are explained in more detail in accordance with the following:

With respect to the first such process, 2,6-dihalo-4-nitro-anilines are first diazotized, the diazo compounds are then reacted with sodium alkyl-mercaptides to give the corresponding 4-azoxy- or 4-nitro-2,6-dihalo-thiophenolethers and these thiophenolethers are reduced with iron and hydrochloric acid to give the corresponding 4-alkylmercapto-3,5-dihalo-anilines (cf., for example, J. Am. Chem. Soc. 80, 4939 and 4940).

With respect to the second such process, 3,5-dihalo-anilines are first reacted with a dithiocyanate to give the corresponding 4-thiocyanato-3,5-dihalo-anilines and these thiocyanato-anilines then reacted with an alcohol to give the corresponding 4 - alkyl - mercapto - 3,5 - dihalo - anilines (c.f., for example, Belgian patent specification No. 645,615).

These two processes for preparing the instant alkyl-mercapto derivatives can also be used to synthesize the corresponding alkenyl-mercapto derivatives.

According to the two production processes described above, those active compounds according to the present invention are obtained which are unsubstituted on the nitrogen atom.

Also, the instant N-substituted derivatives are prepared from the anilines according to known methods. Thus, the N-alkyl compounds are obtained by alkylation of the anilines with, for example, alkyl halides or alkyl sulfates; the alkenyl derivatives by the reaction with, for example, alkenyl halides; the acyl derivatives, e.g. alkyl carbonyl or alkanoyl derivatives, by the reaction with, for example, appropriate acid anhydrides or acid halides; the isocyanates by the reaction with phosgene; and the alkoxy-carbonyl derivatives, e.g. alkoxy carbonyl or alkanoyloxy derivatives, by the reaction of aniline with phosgene to form the isocyanate and the reaction of the isocyanate with an appropriate alcohol.

The production of some of the active compounds according to the present invention is described in greater detail in connection with the following:

81 parts of 3,5-dichloroaniline are dissolved in 800 parts of methanol saturated with potassium bromide, and 125 parts of potassium thiocyanate are then added. There is added thereto at 3–10° C., within the course of 1.5 hours, a solution of 90 parts of bromine in 320 parts of methanol saturated with potassium bromide. The reaction mixture is further stirred for one hour and introduced into 6000 parts of water, filtered off with suction and recrystallized from methanol. There are obtained 100 parts of 3,5-dichloro-4-thiocyanato-aniline, corresponding to 91% of theory: M.P. 167–168° C.

73 parts of this thiocyanide are heated at 110–120° C. for 3 hours in an autoclave with a solution of 15 parts of sodium hydroxide in 230 parts of methanol. After cooling, the solution is filtered off with suction from the sodium cyanate which is washed with methanol. By concentrating the methanol solution, there are obtained 57 parts of 4-methylmercapto-3,5-dichloro-aniline (Ia') which melts at 125–126° C. after recrystallization from carbon tetrachloride.

In a similar manner, the following compounds are obtained:

(II) 4-ethylmercapto-3,5-dichloroaniline, M.P. 105–106° C.
(III) 4-propylmercapto-3,5-dichloroaniline, M.P. 104–105° C.

(IV) 4-isopropylmercapto-3,5-dichloroaniline, M.P. 129–130° C.
(V) 4-butylmercapto-3,5-dichloroaniline, M.P. 90–91° C.
(VI) 4-allylmercapto-3,5 - dichloroaniline, M.P. 104–105° C.
(VII) 4-methylmercapto-3,5-dichlorophenylisocyanate, B.P. 121–123° C., 0.6 mm. Hg
(VIII) 4-methylmercapto-3,5-dichloro-carbanilic acid methyl ester, M.P. 101–102° C.
(IX) 4-ethylmercapto-3,5-dichloro-carbanilic acid methyl ester, M.P. 101–102° C.
(X) 4-methylmercapto-3,5-dichloro-N-methyl-acetanilide, M.P. 102–104° C.
(XIa') 4-methylmercapto-3,5-dibromoaniline, M.P. 102–103° C.
(XII) 4-ethylmercapto-3,5-dibromoaniline, M.P. 74–75° C.
(XIII) 4-ethylmercapto-3,5-dichlorocarbanilic acid β-chloroethyl ester, M.P. 91–92° C.
(XIV) 4-ethylmercapto-3,5-dichloro-N-ethyl acetanilide, M.P. 63° C.

Advantageously, the active compounds according to the present invention exhibit a strong acaricidal activity but have a low toxicity towards warm-blooded creatures as well as a low phytotoxicity. The acaricidal effect starts rapidly and lasts a long time. The instant compounds can, therefore, be used with markedly good results to combat acarids, such as mites (Acarina), and the like.

Among the mites contemplated herein, especially important are the spider mites (Tetranychidae), such as the common spider mite (*Tetranychus urticae*) and the fruit tree spider mite (*Paratetranychus pilosus*), and the like; as well as the gall mites, such as the red currant gall mite (*Eriophyes ribis*), tarsonemides, such as *Tarsonemus pallidus*, and ticks and the like.

It is especially notable that the particular active compounds according to the present invention are effective against normally sensitive as well as all resistant strains of mites.

Thus, the new compounds of the instant invention can be used as pesticides, especially acaricides, either alone or in admixture with solid or liquid carriers or diluents.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.) and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001% and 20%, preferably substantially between about 0.001 and 5%, by weight of the mixture. Thus, the present invention contemplates overall compositions which comprise mixtures of a dispersible carrier vehicle, such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally between about 0.00001 and 95% by weight of the mixture.

Furthermore, the present invention contemplates methods of selectively controlling or combating pests, e.g. acarids, which comprise applying to at least one of (a) such pests, and especially acarids, and (b) their habitat, a pesticidally, especially acaricidally, effective amount of the particular active compound of the invention alone or together with a carrier vehicle, as noted above. The instant formulations or compositions are applied to the usual manner, for example, by spraying, atomizing, vaporizing, scattering, dusting, watering, sprinkling, fumigating, and the like.

The following example is given for the purpose of illustrating, while not limiting, the utility of the particular active compounds according to the present invention:

EXAMPLE

Tetranychus test

*Solvent.*—3 parts by weight acetone.
*Emulsifier.*—1 part by weight alkyl-aryl polyglycol ether.

To produce a suitable preparation of the particular active compound, 1 part by weight of such active compound is mixed with the stated amount of solvent containing the stated amount of emulsifier, and the concentrate so obtained is diluted with water to the desired final concentration.

Bush beans (*Phaseolus vulgaris*), which have a height of approximately 10–30 cm., are sprayed with the preparation of the particular active compound until dripping wet. These bush beans are heavily infested with the common spider mite (*Tetranychus telarius*) in all stages of development.

After the specified period of time, the effectiveness of the preparation of the given active compound is determined by counting the dead mites. The degree of destruction thus obtained is expressed percentagewise: 100% indicates that all the spider mites are killed, whereas 0% indicates that none is killed.

The active compounds, their concentrations, the evaluation time and the results obtained can be seen from the following table:

TABLE (Plant-damaging mites)

| Active compound | | Concentration of active compound in percent by weight | Degree of destruction in percent, after 8 days |
|---|---|---|---|
| (A) | Parathion | 0.2 | 20 |
| (Ia″) | $CH_3-S-$ 3,5-Cl$_2$-C$_6$H$_2$-NH$_2$ (known) | 0.2<br>0.02<br>0.002 | 100<br>100<br>20 |
| (II′) | $C_2H_5-S-$ 3,5-Cl$_2$-C$_6$H$_2$-NH$_2$ | 0.2<br>0.02<br>0.002 | 100<br>98<br>70 |
| (III′) | $C_3H_7-S-$ 3,5-Cl$_2$-C$_6$H$_2$-NH$_2$ | 0.2<br>0.02 | 100<br>70 |
| (V′) | $C_4H_9-S-$ 3,5-Cl$_2$-C$_6$H$_2$-NH$_2$ | 0.2 | 70 |
| (IV′) | $(CH_3)_2CH-S-$ 3,5-Cl$_2$-C$_6$H$_2$-NH$_2$ | 0.2<br>0.02 | 100<br>70 |
| (VI′) | $CH_2=CH-CH_2-S-$ 3,5-Cl$_2$-C$_6$H$_2$-NH$_2$ | 0.2<br>0.02 | 100<br>70 |
| (VII′) | $CH_3-S-$ 3,5-Cl$_2$-C$_6$H$_2$-N=CO | 0.2<br>0.02 | 90<br>50 |
| (VIII′) | $CH_3-S-$ 3,5-Cl$_2$-C$_6$H$_2$-NH-COOCH$_3$ | 0.2<br>0.02<br>0.002 | 100<br>90<br>20 |
| (IX′) | $C_2H_5-S-$ 3,5-Cl$_2$-C$_6$H$_2$-NH-COOCH$_3$ | 0.2<br>0.02 | 100<br>50 |
| (X′) | $CH_3-S-$ 3,5-Cl$_2$-C$_6$H$_2$-N(CH$_3$)-CO-CH$_3$ | 0.2<br>0.02 | 100<br>70 |
| (XIa″) | $CH_3-S-$ 3,5-Br$_2$-C$_6$H$_2$-NH$_2$ (known) | 0.2 | 70 |

TABLE—Continued

| Active compound | Concentration of active compound in percent by weight | Degree of destruction in percent, after 8 days |
|---|---|---|
| (XII′) C₂H₅—S—[3,5-Br₂-C₆H₂]—NH₂ | 0.2<br>0.02 | 50<br>20 |
| (XIII′) C₂H₅—S—[3,5-Cl₂-C₆H₂]—NH—COOCH₂—CH₂Cl | 0.2 | 98 |
| (XIV′) C₂H₅S—[3,5-Cl₂-C₆H₂]—N(C₂H₅)—CO—CH₃ | 0.2<br>0.02 | 100<br>20 |

In a manner analogous to the foregoing, the following compounds may be produced, all of which possess the desired pesticidal and especially acaricidal properties noted above:

4-methylmercapto-3,5-dichloro-N,N-dimethyl aniline;
4-methylmercapto-3,5-dichloro-N-sec.-butyl-N-isopropyl aniline;
4-tert.-butylmercapto-3,5-dichloro-N-methyl-N-n-amyl-aniline;
4-n-propylmercapto-3,5-dichloro-N-n-amyl-N-vinyl aniline;
4-tert.-butylmercapto-3,5-dichloro-N-ethyl-N-α-allyl aniline;
4-isopropylmercapto-3,5-dichloro-N-methyl-bromo-acetanilide, and the corresponding di-bromo-aniline compounds.

Advantageously, in accordance with the present invention in the foregoing formulae:

R represents lower alkyl, such as methyl, ethyl, n-propyl, isopropyl, n-butyl, iso-butyl, sec.-butyl, tert.-butyl, and the like, preferably C₁–C₄ alkyl; and lower alkenyl, such as vinyl, α-, β-, and γ- - allyl, 1-, 2-, 3-, -butenyl, and the like, preferably alkenyl having 2 to 4 carbon atoms;

R′ represents hydrogen and lower alkyl, such as methyl, ethyl, n-propyl, isopropyl, n-butyl, iso-butyl, sec.-butyl, tert.-butyl, n-amyl, iso-amyl, and the like, especially C₁–C₅ alkyl and more especially C₁–C₂ alkyl;

R″ represents hydrogen; alkyl, such as those species enumerated immediately hereinabove for the radical R′, and especially lower alkyl and more especially C₁–C₅ alkyl; alkenyl, such as viny, α-, β-, and γ- -alyl, 1-, 2-, and 3- -butenyl, 1-, 2-, 3-, and 4- -pentenyl, and the like, and especially lower alkenyl, and more especially C₂–C₅ alkenyl; alkyl-carbonyl, such as formyl, acetyl, propionyl, butyryl, and the like; and especially alkanoyl, and more especially lower alkanoyl having 1 to 3 carbon atoms; alkoxy carbonyl, such as formyloxy (carboxy), acetyloxy (carbomethoxy), propionyloxy (carboethoxy), butyryloxy (carbopropoxy), and the like, especially alkanoyloxy, and more especially lower alkanoyloxy (i.e. lower alkoxy carbonyl) having 1 to 3 carbon atoms; halo-alkyl carbonyl, such as mono-, di-, and poly- chloro, bromo, iodo, fluoro, and mixed halo substituted, and most especially chloro and/or bromo substituted, formyl, acetyl, propionyl, butyryl, and the like, especially halo-lower alkanoyl containing 1 to 3 carbon atoms; and halo-alkoxy carbonyl, such as mono-, di-, and poly- chloro, bromo, iodo, fluoro, and mixed halo substituted, and most especially chloro and/or bromo substituted, formyloxy, acetyloxy, propionyloxy, butyryloxy, and the like, and especially halo-lower alkanoyloxy (i.e. halo-lower alkoxy carbonyl) containing 1 to 3 carbon atoms; with the proviso that R′ and R″ when taken together represent the carbonyl radical.

More especially, with respect to the particular new compounds in accordance with the present invention, the foregoing definitions are limited by the further proviso that where R′ and R″ are hydrogen and both X radicals are the same, especially where both are chloro or bromo, R contains at least two carbon atoms.

Therefore, in particular, in accordance with the present invention, while X may be either chloro or bromo, R is either alkyl having 1 to 4 carbon atoms or alkenyl having 2 to 4 carbon atoms, R′ is hydrogen or alkyl having 1 to 2 carbon atoms, and R″ is either hydrogen or alkanoyl having 1 to 3 carbon atoms, alkanoyloxy (i.e. alkoxy carbonyl) having 1 to 3 carbon atoms, chloro-substituted alkanoyl having 1 to 3 carbon atoms, bromo-substituted alkanoyl having 1 to 3 carbon atoms, chloro-substituted alkanoyloxy (i.e. alkoxy carbonyl) having 1 to 3 carbon atoms, or bromo-substituted alkanoyloxy (i.e. alkoxy carbonyl) having 1 to 3 carbon atoms, with the proviso that R′ and R″ where taken together represent the carbonyl radical, and especially with the proviso that where both R′ and R″ are hydrogen, both X radicals being the same, R contains at least two carbon atoms.

All of the foregoing compounds, i.e., embraced by the radical definitions set forth above, in accordance with the present invention, possess the desired significantly high pesticidal, and especially acaricidal, effectiveness while similarly possessing extremely low toxicity toward warm-blooded creatures as well as a comparatively low phytotoxicity, especially regarding cultivated plants which are generally distinguished from undesired plants as contemplated within the term "weeds." All of the foregoing compounds may, therefore, be used as acaricides, without damaging cultivated plants which may represent the habitat of the acarids being combated.

It will be appreciated that the instant specification and examples are set forth by way of illustration and not limitation, and that various modifications and changes may be made without departing from the spirit and scope of the present invention.

What is claimed is:

1. Method of combating acarids which comprises applying to at least one of (a) such acarids and (b) their habitat, an acaricidally effective amount of a 3,5-dihalo-aniline having the formula

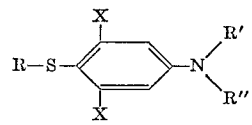

in which each X respectively is selected from the group consisting of chloro and bromo, R is selected from the group consisting of lower alkyl and lower alkenyl, R' is selected from the group consisting of hydrogen and lower alkyl, and R" is selected from the group consisting of hydrogen, lower alkyl, lower alkanoyl, lower alkoxy carbonyl, halo-lower alkanoyl, and halo-lower alkoxy carbonyl, with the proviso that R' and R" where taken together represent the carbonyl radical.

2. Method according to claim 1 wherein such compound is 4-ethylmercapto-3,5-dichloroaniline.

3. Method according to claim 1 wherein such compound is 4-propylmercapto-3,5-dichloroaniline.

4. Method according to claim 1 wherein such compound is 4-isopropylmercapto-3,5-dichloroaniline.

5. Method according to claim 1 wherein such compound is 4-butylmercapto-3,5-dichloroaniline.

6. Method according to claim 1 wherein such compound is 4-allylmercapto-3,5-dichloroaniline.

7. Method according to claim 1 wherein such compound is 4-methylmercapto-3,5-dichlorophenylisocyanate.

8. Method according to claim 1 wherein such compound is 4-methyl-mercapto-3,5-dichloro-carbanilic acid methyl ester.

9. Method according to claim 1 wherein such compound is 4-ethylmercapto - 3,5 - dichloro-carbanilic acid methyl ester.

10. Method according to claim 1 wherein such compound is 4-methylmercapto - 3,5-dichloro-N-methyl-acetanilide.

11. Method according to claim 1 wherein such compound is 4-ethylmercapto-3,5-dibromoaniline.

12. Method according to claim 1 wherein such compound is 4-ethyl-mercapto-3,5-dichlorocarbanilic acid β-chloroethyl ester.

13. Method according to claim 1 wherein such compound is 4-ethyl-mercapto-3,5-dichloro - N - ethyl-acetanilide.

14. Method according to claim 1 wherein such compound is 4-methylmercapto-3,5-dichloro-aniline.

15. Method according to claim 1 wherein such compound is 4-methylmercapto-3,5-dibromoaniline.

References Cited
FOREIGN PATENTS
837,802  6/1960  Great Britain.

OTHER REFERENCES
Chem. Ab., vol. 55 (1961), p. 2197.
Ore et al.: J. Am. Chem. Soc. 80, 4939–4940, 1958.

ALBERT T. MEYERS, Primary Examiner

A. J. ROBINSON, Assistant Examiner

U.S. Cl. X.R.

260—453, 470, 562, 578; 424—300, 324, 330